United States Patent
Almehio et al.

(10) Patent No.: US 12,041,705 B2
(45) Date of Patent: Jul. 16, 2024

(54) METHOD FOR MANAGING IMAGE DATA, AND VEHICLE LIGHTING SYSTEM

(71) Applicant: VALEO VISION, Bobigny (FR)

(72) Inventors: Yasser Almehio, Bobigny (FR); Hafid El Idrissi, Bobigny (FR); Constantin Prat, Bobigny (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 17/918,460

(22) PCT Filed: Apr. 22, 2021

(86) PCT No.: PCT/EP2021/060608
§ 371 (c)(1),
(2) Date: Oct. 12, 2022

(87) PCT Pub. No.: WO2021/214262
PCT Pub. Date: Oct. 28, 2021

(65) Prior Publication Data
US 2023/0141722 A1 May 11, 2023

(30) Foreign Application Priority Data
Apr. 23, 2020 (FR) ........................ 2004089

(51) Int. Cl.
*B60Q 1/14* (2006.01)
*H05B 47/18* (2020.01)

(52) U.S. Cl.
CPC ............. *H05B 47/18* (2020.01); *B60Q 1/143* (2013.01); *B60Q 2400/50* (2013.01)

(58) Field of Classification Search
CPC ...... H05B 47/10; H05B 47/105; H05B 47/18; H05B 45/30; H05B 45/305; B60Q 1/143; B60Q 2400/50
See application file for complete search history.

(56) References Cited

U.S. PATENT DOCUMENTS

| | | | |
|---|---|---|---|
| 10,870,386 B2 | 12/2020 | Muramatsu | |
| 11,338,723 B2 | 5/2022 | Shibata | |
| 11,358,516 B2 | 6/2022 | Lahmer | |
| 2011/0215917 A1 | 9/2011 | Bolduc et al. | |
| 2015/0149045 A1* | 5/2015 | Mizuno | B60Q 1/08 701/49 |
| 2020/0084854 A1 | 3/2020 | Bonn et al. | |

FOREIGN PATENT DOCUMENTS

| CN | 206884861 U | 1/2018 |
|---|---|---|
| CN | 108569193 A | 9/2018 |

(Continued)

OTHER PUBLICATIONS

Japan Patent Office, Office Action of corresponding Japanese Patent Application No. 2022-562890, dated Nov. 7, 2023.

(Continued)

*Primary Examiner* — Jimmy T Vu
(74) *Attorney, Agent, or Firm* — Valeo Vision (57) ABSTRACT

A method for managing image data in a vehicle lighting system that includes a lighting module and a multiplexed bus for transmitting compressed image data to the lighting module. The method includes receiving an instruction to trigger at least one lighting function to be generated by the at least one lighting module. Determining a required data rate level for transmitting the compressed image data over the multiplexed bus. Comparing the determined data rate level with a data rate threshold value of the multiplexed bus. Compressing the image data of the lighting function according to: the first frequency when the determined data rate level is lower than or equal to the data rate threshold value and according to a second frequency selected within the frequency range such that the second frequency is lower than the first frequency when the determined data rate level is greater than the data rate threshold value.

10 Claims, 4 Drawing Sheets

(56) References Cited

FOREIGN PATENT DOCUMENTS

| CN | 110914108 A | 3/2020 |
|---|---|---|
| JP | 2004104529 A | 4/2004 |
| JP | 2005184395 A | 7/2005 |
| JP | 2007214769 A | 8/2007 |

OTHER PUBLICATIONS

European Patent Office, International Search Report (with English translation) and Written Opinion of corresponding International Application No. PCT/EP2021/060608, dated Jun. 21, 2021.

Pradeep Y B: "CAN—FD and Ethernet Create Fast Reliable Automotive Data Buses for the Next Decade", Internet Citation, Apr. 1, 2013, pp. 36-43, XP002713064 <<http://www.atmel.com/ja/jp/Images/Article_AC10_CAN-FD-and-Ethernet.pdf>> (retrieved from the Internet Sep. 17, 2013), XP002713064 paragraph "Advanced Driver Assistance Systems", p. 42.

Anonymous, "Video transfer through a CAN Bus—Other microcontrollers forum—Other microcontroller—Ti E2E support forums", Jul. 1, 2015, <<http://www.e2e.ti.com/support/microcontrollers/other/f/908/t/440869>> (retrieved from the Internet Dec. 4, 2020), XP055756902—the whole document.

China Patent Office, Office Action (with English summary) of corresponding Chinese Patent Application No. 202180029872.9, dated May 1, 2024.

* cited by examiner

METHOD FOR MANAGING IMAGE DATA, AND VEHICLE LIGHTING SYSTEM

CROSS-REFERENCE TO RELATED APPLICATIONS

This application is filed under 35 U.S.C. § 371 U.S. National Phase of International Application No. PCT/EP2021/060608 filed Apr. 22, 2021 (published as WO2021214262), which claims priority benefit to French Application No. 2004089 filed on Apr. 23, 2020, the disclosures of which are herein incorporated by reference in their entirety.

TECHNICAL FIELD

This invention relates to the field of vehicle lighting systems, and more particularly to managing image data for controlling a vehicle's light sources.

BACKGROUND OF THE INVENTION

Current lighting systems comprise, in particular, light sources that now make it possible to project a high-definition light beam. The desired projection of high-definition light can be obtained via the light sources and from images, or image patterns, that the sources receive in order to display them and thus project a given light beam. These images or image patterns can achieve very high resolutions now, in particular depending on the resolution of the light source used. By way of example, the light source can have at least 4 000 to 30 000 pixels, thus making it possible to generate a light beam from an image with this level of resolution.

BRIEF SUMMARY OF THE INVENTION

To succeed in generating such high-definition light beams, multiple light sources can be used, or combined, which requires controlling them and finely synchronizing these sources in order to provide well-controlled, varied and adaptive lighting functionalities.

Vehicles therefore bear increasingly greater numbers of light sources, which use increasingly heavy high-definition image data, involving a large amount of data that must be managed by a vehicle control unit and communicated via a transmission means between the control unit and the one or more light sources. To do this, for example, a CAN protocol data bus is often used to transfer such data between the control unit and the light source. However, these data transmission means have the drawback of having a limited bandwidth, not allowing, for example, a bit rate of 2 to 5 Mbps to be exceeded in general. As a result, difficulties arise in transmitting the large amount of data required for said high-definition images over these limited networks. In addition, these networks are also used for the communication of other vehicle data, which means that the bandwidth available for high-definition image data can be even lower, for example limited to a range of 70 to 90% of the maximum bit rate possible over the data transmission network.

By way of example, to communicate high-definition image data for the projection of a lighting function with a resolution of 20 000 pixels, the bit rate required over a CAN-FD transmission network would generally be 10 to 12 Mbps. However, such a CAN-FD network is currently actually limited to 5 Mbps (or even 2 Mbps in most cases). There is therefore a need to optimize the data transmitted over these networks, and in particular to compress the data that are communicated in order to transmit a stream of high-definition image data that is sufficient to ensure the one or more associated lighting functions, while observing the bit rate and bandwidth constraints of this same network.

Known compression methods have been considered to overcome this problem. However, they have all proven to be inadequate with respect to high-beam specificity, thereby hindering a sufficient reduction in the bandwidth as required by vehicle manufacturers.

To achieve this, provision could be made for multiple levels or iterations of data compression to be carried out, until succeeding in meeting a desired bandwidth. Still, such an approach has a very significant impact on the display quality of the projected lighting functions, since with each compression performed, display quality is affected; it is reduced.

However, for certain lighting functions, for example adaptive driving beams (ADBs) and road writing (RW), display quality cannot be overly degraded, as otherwise the user experience will be significantly lessened, with the light information projected by the light beam being made unclear, inadequate or even illegible.

A solution to these problems is therefore sought in order to overcome the drawbacks mentioned above.

According to a first aspect of the invention, the invention provides a solution to the stated problems by means of a method for managing image data in a vehicle lighting system, the lighting system comprising:
  at least one lighting module capable of projecting lighting functions on the basis of compressed image data, and
  a multiplexed bus for transmitting compressed image data to said at least one lighting module,
  the method comprising the following steps:
  receiving an instruction to trigger at least one lighting function, said at least one lighting function being configured to be generated by the at least one lighting module from compressed image data corresponding to lighting patterns displayed in a given frequency range,
  determining, for the generation of at least one lighting function at a first frequency chosen in said frequency range, a bit rate level required to transmit the compressed image data over said multiplexed bus,
  comparing the determined bit rate level with a bit rate threshold value of the multiplexed bus,
  compressing the image data of the at least one lighting function at:
  said first frequency when the determined bit rate level is lower than or equal to said bit rate threshold value, and at
  a second frequency chosen in said frequency range such that the second frequency is lower than the first frequency, when the determined bit rate level is greater than said bit rate threshold value,
  transmitting the image data compressed at one of the first and second frequencies to said at least one lighting module via said multiplexed bus in order for the at least one lighting function to be generated.

This method thus aims to use a display frequency for the compressed image data which is dynamic, and in particular lower when the bit rate required to transmit these data is greater than the capabilities of the data transmission bus. By limiting the display frequency, at least temporarily, it is then possible to:
  reduce the amount of data to be communicated via the multiplexed bus (decrease the number of images),
  maintain a high level of image data compression while observing the maximum allowed bandwidth, maintain good image quality without having, for example, to degrade it by further compressing the already compressed image data in order to succeed in observing the maximum bit rate of the multiplexed bus, provide for the transmission of high-definition image data over the multiplexed bus while only temporarily negatively affecting the display fluidity of the lighting function.

In this case, the temporary limitation on the display speed will have a small impact on the display fluidity of the lighting functions. This will not be, or be only very slightly, noticeable on lighting functions such as low beam and high beam, and will have a limited impact on the user's experience when using functions such as adaptive driving beam ADB and road writing RW.

According to one advantageous embodiment, the given frequency range is between 10 Hz and 120 Hz.

This frequency range makes it possible to address the display constraints of various lighting functions, such as, for example:

Low beam (LB),

High beam (HB), adaptive driving beam (ADB) or road writing (RW).

According to one advantageous embodiment, said first frequency is chosen between 50 Hz and 60 Hz and the second frequency is chosen between 30 Hz and 40 Hz.

By way of example, for a lighting function such as adaptive driving beam ADB or road writing RW, the first frequency from 50 Hz to 60 Hz may be used for good display fluidity and the second frequency from 30 Hz to 40 Hz may be used for lower fluidity in order to provide for the transmission of high-definition image data over the multiplexed bus in the event of limited bandwidth.

According to one advantageous embodiment, the compression of the image data of the at least one lighting function is performed with a compression rate greater than or equal to 75%.

A compression of at least 75% is a compression rate that allows image data for a high-definition lighting feature, or a combination of high-definition lighting features, to go over bandwidth-limited vehicle-to-vehicle transmission buses. Further preferably, the compression rate is greater than or equal to 85%.

According to one advantageous embodiment, the at least one lighting function is at least one light function chosen from high beam, adaptive driving beam and road writing.

According to one advantageous embodiment, multiple lighting functions may be generated simultaneously by the lighting system.

According to one advantageous embodiment, following the step of compressing the image data, when the image data are compressed at the second frequency, the method further comprises steps of:

determining, for the generation of the at least one lighting function at the second frequency, a bit rate level required to transmit the compressed image data over said multiplexed bus, comparing the determined bit rate level with the bit rate threshold value of the multiplexed bus, transmitting, to said at least one lighting module via the multiplexed bus:

image data compressed at the second frequency when the determined bit rate level is lower than or equal to said bit rate threshold value, and image data of the last image transmitted via the multiplexed bus when the determined bit rate level is greater than the bit rate threshold value.

According to this embodiment, in the event that the bit rate over the multiplexed bus is insufficient to allow the image data compressed at the second frequency through, provision is made to continue broadcasting the image data for the last displayed image in order to ensure that the light source will maintain a lighting function, for the safety of the driver and of other road users.

According to a second aspect of the invention, the invention also relates to a lighting system comprising:

at least one lighting module capable of projecting lighting functions on the basis of compressed image data, a multiplexed bus for transmitting compressed image data to said at least one lighting module, and a control system configured to implement the method for managing image data as described above.

According to another advantageous embodiment, the control system comprises:

a first control unit, provided with a processor unit, configured to:

compress image data according to one of the first and second frequencies for generating the at least one lighting function, transmit, to said at least one lighting module via said multiplexed bus, the compressed image data, a second control unit, provided with a processor unit, configured to:

receive compressed image data that are transmitted via said multiplexed bus, decompress the received image data, generate the at least one lighting function according to one of the first and second frequencies from the received and decompressed image data.

According to another advantageous embodiment, the at least one lighting module comprises at least one semiconductor light source, such as LEDs, and in particular a pixelated LED source.

In comparison with incandescent lighting, semiconductor lighting generates visible light with lower heat production and less energy dissipation. The generally low weight of a semiconductor electronic lighting device affords greater resistance to impacts and vibrations than brittle glass tubes/bulbs and long, thin filament wires. They are also not subject to filament evaporation, which may increase the service life of the lighting device. Some examples of these types of lighting comprise solid-state light-emitting diodes (LEDs), organic light-emitting diodes (OLEDs), or polymer light-emitting diodes (60s) as light sources instead of electrical filaments, plasma or gas. The high-definition lighting functions may be provided by projecting one or more light beams projected by an LED source or a set of LEDs, or by a pixelated LED source.

Unless otherwise defined, all terms (including technical and scientific terms) used in this document should be interpreted in accordance with the standard practices of the profession. It is also understood that terms in common use are to be interpreted as customary in the relevant art and not in an idealized or overly formal sense, unless expressly defined as such herein.

In this text, the term "comprises" and derivatives thereof (such as "comprising", etc.) should not be understood in an exclusive sense, i.e. these terms should not be interpreted as excluding the possibility that what is described and defined may include other elements, steps, etc.

BRIEF DESCRIPTION OF THE DRAWINGS

To supplement the description and to allow better understanding of the invention, a set of drawings is provided.

These drawings form an integral part of the description and illustrate one embodiment of the invention, which should not be interpreted as limiting the scope of the invention, but merely as an example of how the invention may be carried out. The drawings comprise the following figures.

DETAILED DESCRIPTION OF THE INVENTION

In these figures, the following references have been used:
2 Low-beam lighting function
4 High-beam lighting function
6 Adaptive driving beam lighting function
8 Road writing lighting function
10 Lighting system
20 Control system
30 Lighting function driver module
40 Multiplexed data transmission bus
50 Lighting module
60, 62, 64, 66, 68 Semiconductor light source
70 First control unit
72 Second control unit
80 First processor unit
82 Second processor unit
52 First lighting module
54 Second lighting module
100 Instruction-receiving step
110 Determining step
120 Comparing step
130 Compressing image data step
140 Transmitting compressed image data step
200 First compression frequency
205 Second compression frequency
210 First compression rate
215 Second compression rate
90 vehicle lighting device
95 lighting optic The exemplary embodiments are described in sufficient detail to allow those of ordinary skill in this art to carry out and implement the systems and methods described herein. It is important to understand that these embodiments may be provided in a number of alternative forms and should not be construed as being limited to the examples presented here. Consequently, although the embodiments may be modified in various ways and take various alternative forms, specific embodiments thereof are shown in the drawings and described in detail below by way of example. No limitation to the particular examples disclosed is intended. Rather, all modifications, equivalents and alternatives falling within the scope of the appended claims are to be included.

Figure 1:
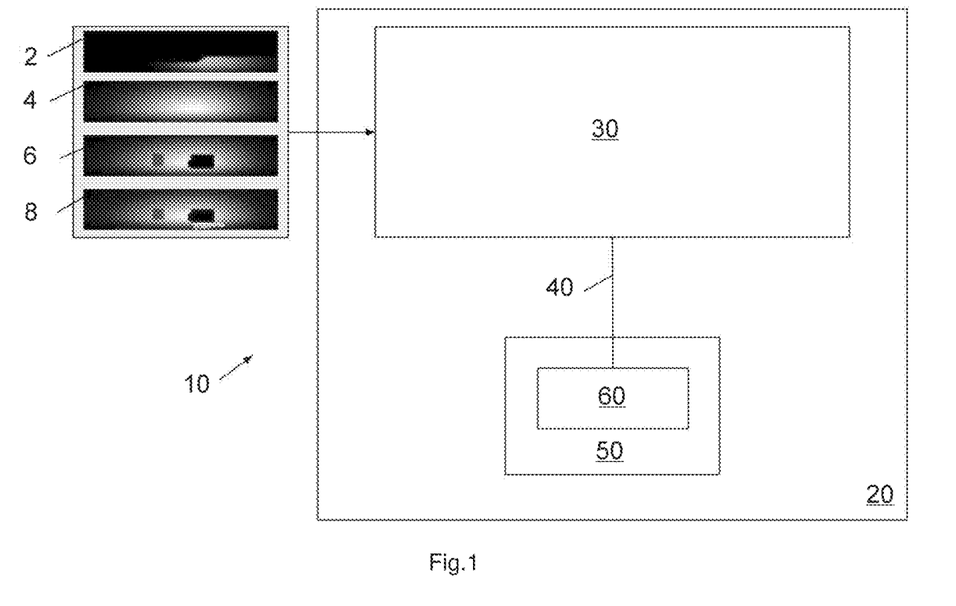
FIG. 1 shows a first embodiment of the lighting system according to the invention.

Reference is first made to FIG. 1 which shows a first embodiment of the lighting system 10 according to the invention. The lighting system 10 comprises in particular:
at least one lighting module 50 capable of projecting lighting functions on the basis of compressed image data,
a multiplexed bus 40 for transmitting compressed image data to the lighting module 50, and
a control system 20 configured to implement the method for managing image data as proposed, with a view to generating given lighting functions.

To this end, the control system 20 may receive instructions from a vehicle control unit (not shown in the figures) to generate each of the lighting functions independently of each other or, conversely, in combination. For example, the lighting functions may be combined with each other in pairs. According to another example, three or four lighting functions, or even all of the possible lighting functions, may be combined with each other.

The vehicle control unit may generate the instructions for generating lighting functions from a lighting command given by the driver, or from a lighting command determined by a detection unit, such as a camera or a light detector.

The instructions received by the control system 20 may, in particular, be instructions for generating a light beam corresponding to the following lighting functions:
Low beam 2,
High beam 4,
Adaptive driving beam 6, or
Road writing 8.
What is meant by adaptive driving beam 6 is any lighting function that allows the lighting beam to be varied dynamically in order to adapt it to vehicle traffic situations. For example, this may relate to a function in which the lighting is projected with high-beam type photometry while avoiding dazzling other road users. As a variant or in addition, the function may relate to:
a photometry that allows dynamic directional lighting, in other words a horizontal displacement of the maximum intensity of an LB 2 or HB 4 photometry depending on the rotational angle of the steering wheel of a motor vehicle (also known as DBL for dynamic bending light);
lighting that makes it possible to avoid glare from road signs as a result of the projection of light beams from the motor vehicle (also known as TSAG for traffic sign anti-glare);
lighting that allows the projection of line-type patterns on the road, in particular to delimit a portion of road to be taken by the motor vehicle or to present an obstacle avoidance strategy (also known as LA for line assist).
What is meant by road writing 8 is any lighting function that allows the projection on the road of patterns visible to the driver and/or road users, in particular driving aids, signaling symbols or other indicators for navigation, for example.

The control system 20 may further comprise a driver module 30 for driving the vehicle's light sources, which is able to receive the instructions for generating lighting functions and to control the vehicle's light sources so as to generate the desired light beam for the requested lighting function. To do this, the control module 30 may, in particular, interface with the multiplexed bus 40 to transmit the required image data to the lighting module 50 in order to project the desired lighting functions.

The multiplexed bus may be chosen from any data transmission bus known in the vehicle field, and in particular a CAN or CAN-FD protocol data bus.

To generate light beams associated with lighting functions to be triggered, the lighting module 50 comprises at least one light source, and in particular a semiconductor light source 60, such as LEDs, and in particular a pixelated LED source.

In this way, the lighting system 10 is able to cause light beams to be projected by the light source 60 based on compressed image data received via the multiplexed bus 40. In addition, the lighting system 10 aims to compress the image data via the control system 20, for example at the level of the driver module 30, according to the desired lighting functions and the implementation of the proposed method for managing image data.

Figure 2:
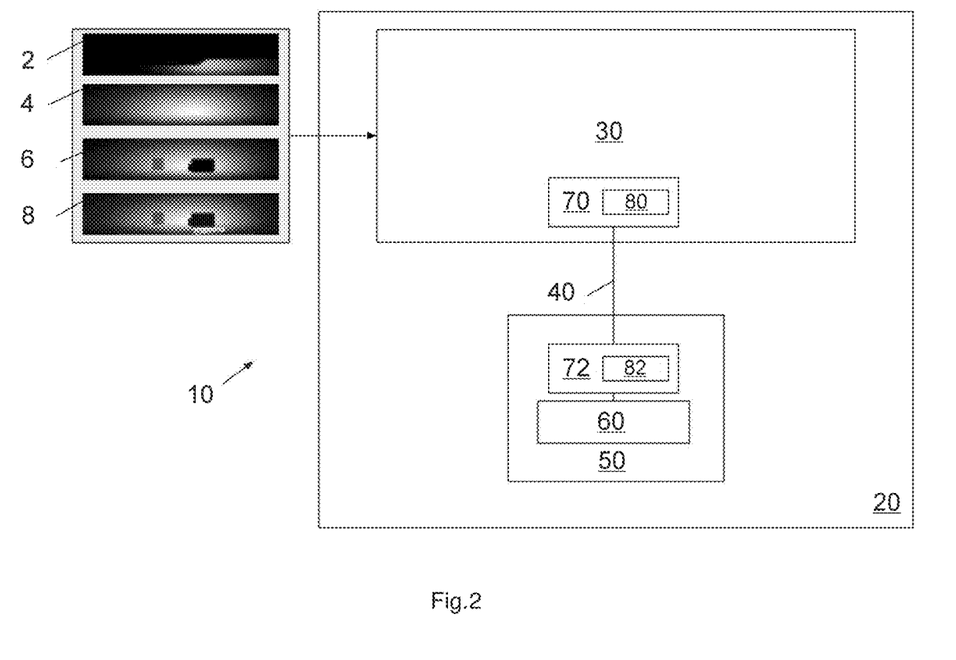
FIG. 2 shows a second embodiment of this lighting system.

Reference is now made to FIG. 2 which shows a second embodiment of the lighting system 10, in which the control system 20 further comprises:
- a first control unit 70 (for example integrated into the driver module 30) equipped with a processor unit 80 configured to:
- compress image data for lighting functions HB 4, ADB 6, RW 8,
- transmit the compressed image data to the lighting module 50 via the multiplexed bus 40,
- a second control unit 72 (for example integrated into the lighting module 50) equipped with a processor unit 82 configured to:
- receive compressed image data that are transmitted via said multiplexed bus 40,
- decompress the received image data,
- generate the at least one lighting function HB 4, ADB 6, RW 8 based on the received and decompressed image data.

Figure 3:
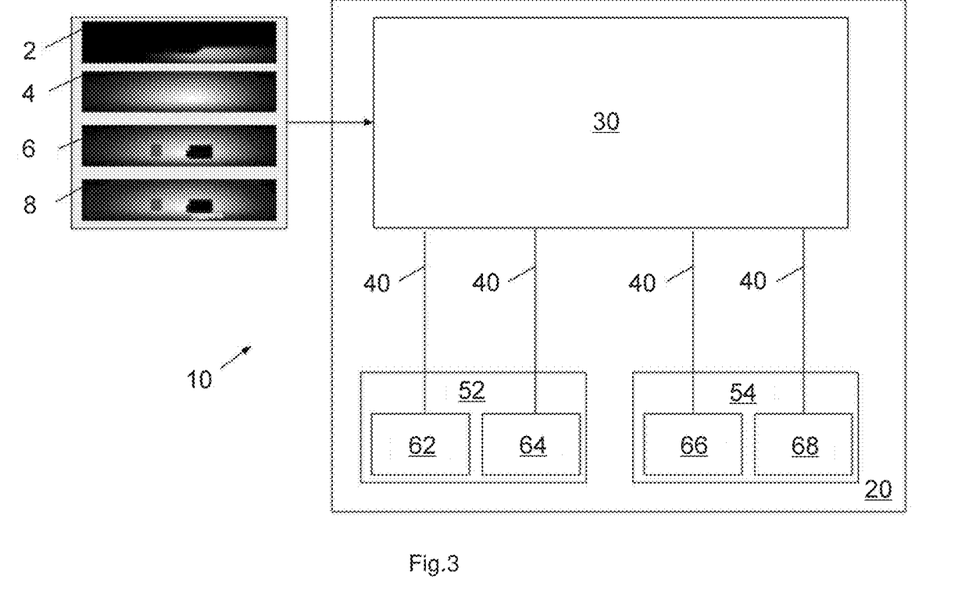
FIG. 3 shows a third embodiment of this lighting system.

Reference is now made to FIG. 3 which shows a third embodiment of the lighting system 10 in which the control system 20 comprises a first lighting module 52 and a second lighting module 54, which may be configured to be:
- each integrated into a different headlamp of the vehicle, for example the first module 52 into the right headlamp of the vehicle and the second module 54 into the left headlamp of the vehicle;
- integrated into one and the same headlamp of the vehicle.

In addition, each module 52 and 54 may comprise a plurality of light sources 62, 64, 66, 68 to allow the light beams of the desired lighting functions LB 2, HB 4, ADB 6, RW 8 to be generated. The light sources 62, 64, 66, 68 may, in particular, be semiconductor light sources 60, such as LEDs, and in particular pixelated LED sources, for example having a resolution of 2 500, 4 000 or 20 000 pixels.

To compress the image data, the desired compression rate is preferably higher than or equal to 75%, or even more preferably higher than or equal to 85%. This is because a compression of at least 75% is a compression rate that allows image data for a high-definition lighting feature, or a combination of high-definition lighting features, to go over bandwidth-limited vehicle-to-vehicle transmission buses, such as the multiplexed bus 40.

Figure 4:
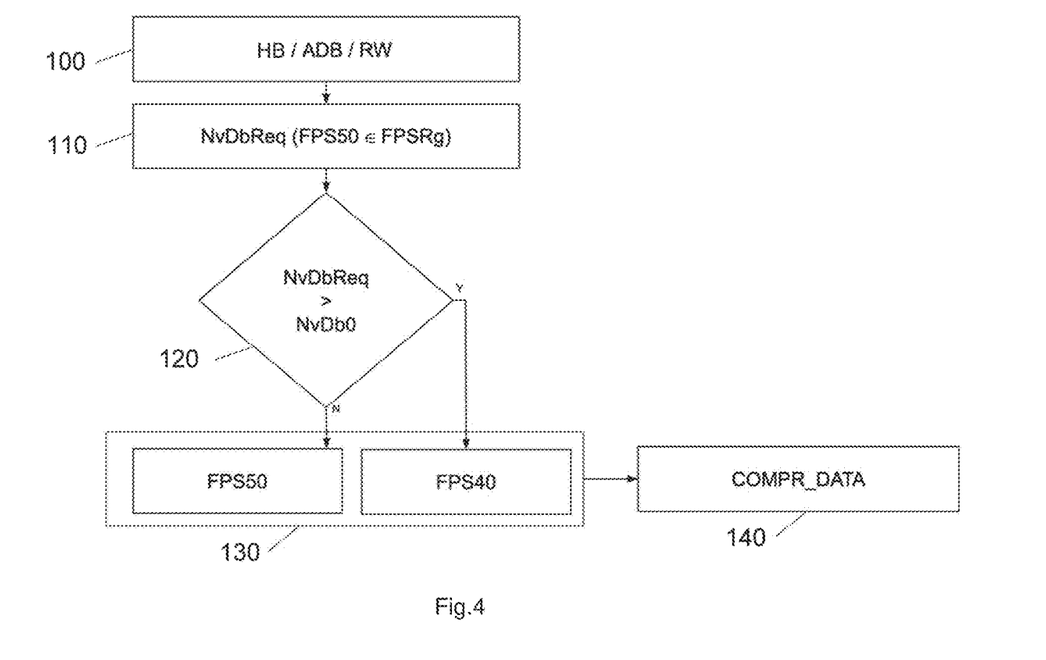
FIG. 4 shows a first representation of steps of the method for managing image data according to the invention.

Reference is now made to FIG. 4 which shows a representation of the steps of the method for managing image data according to the invention. The method comprises, in particular, the following steps:
- receiving 100 an instruction to trigger at least one lighting function HB 4, ADB 6, RW 8, the at least one lighting function HB 4, ADB 6, RW 8 being configured to be generated by the at least one lighting module 50 from compressed image data corresponding to lighting patterns displayed in a given frequency range (FPSRg),
- determining 110, for the generation of at least one lighting function HB 4, ADB 6, RW 8 at a first frequency 200 (FPS50) chosen in the frequency range (FPSRg), a bit rate level (NvDbReq) required to transmit the compressed image data over the multiplexed bus 40,
- comparing 120 the determined bit rate level (NvDbReq) with a bit rate threshold value (NvDb0) of the multiplexed bus 40, compressing 130 the image data of the at least one lighting function HB 4, ADB 6, RW 8 at:
- the first frequency 200 (FPS50) when the determined bit rate level (NvDbReq) is lower than or equal to (output N of 120) the bit rate threshold value (NvDb0), and at
- a second frequency 205 (FPS40) chosen in the frequency range (FPSRg) such that the second frequency 205 (FPS40) is lower than the first frequency 200 (FPS50), when the determined bit rate level (NvDbReq) is greater than (output Y of 120) the bit rate threshold value (NvDb0),
- transmitting 140 the image data (COMPR_DATA) compressed at one of the first 200 (FPS50) and second 205 (FPS40) frequencies to said at least one lighting module 50 via said multiplexed bus 40 in order for the at least one lighting function HB 4, ADB 6, RW 8 to be generated.

The display frequency for the compressed image data is thus driven dynamically. This dynamic management of the display frequency makes it possible, in particular, to adapt the compression rate for the image data so that they may be transmitted adequately via the multiplexed bus 40.

The given frequency range (FPSRg) may, in particular, be between 10 Hz and 120 Hz. This frequency range (FPSRg) may also be expressed as a number of images per second, also called FPS for frames per second, which means that the given frequency range (FPSRg) may be between 10 FPS and 120 FPS.

This frequency range (FPSRg) makes it possible to address the display constraints of various lighting functions, such as, for example:
- Low beam 2,
- High beam 4,
- Adaptive driving beam 6, or
- Road writing 8.

In particular, the first frequency may be chosen between 50 Hz and 60 Hz (which is equivalent to 50 to 60 FPS) and the second frequency may be chosen between 30 Hz and 40 Hz (which is equivalent to 30 to 40 FPS).

By way of example, for a lighting function such as adaptive driving beam 6 or road writing 8, the first frequency from 50 Hz to 60 Hz (50 to 60 FPS) may be used for good display fluidity and the second frequency from 30 Hz to 40 Hz (30 to 40 FPS) may be used for lower fluidity in order to provide for the transmission of high-definition image data over the multiplexed bus 40.

For the compression of the image data as performed in step 130, whether at the first frequency 200 (FPS50) or the second frequency 205 (FPS40), the desired compression rate is preferably greater than or equal to 75%. This is because a compression of at least 75% is a compression rate that allows image data for a high-definition lighting function, or a combination of high-definition lighting functions, to go over bandwidth-limited vehicle transmission buses, such as the multiplexed bus 40.

In the compressing step 130, depending on the instruction to trigger a lighting function that is received, the compressed image data may be:
- those for one and the same lighting function, in particular chosen from high beam 4, adaptive driving beam 6 and road writing 8,
- those resulting from the combination of multiple lighting functions such as, for example, the combination of adaptive driving beam 6 and road writing 8.

Furthermore, in the step of compressing 130 the image data, when the image data are compressed at the second frequency 205 (FPS40), the method may further comprise additional steps (not illustrated in the figures) of:
determining, for the generation of the at least one lighting function HB 4, ADB 6, RW 8 at the second frequency 205 (FPS40), a bit rate level (NvDbReq) required to transmit the compressed image data over the multiplexed bus 40,
comparing the determined bit rate level (NvDbReq) with the bit rate threshold value (NvDb0) of the multiplexed bus 40,
transmitting, to the lighting module 50 via the multiplexed bus 40:
image data compressed at the second frequency 205 (FPS40) when the determined bit rate level (NvDbReq) is lower than or equal to the bit rate threshold value (NvDb0), and
image data of the last image transmitted via the multiplexed bus 40 when the determined bit rate level (NvDbReq) is greater than the bit rate threshold value (NvDb0).

Thus, in the event that the bit rate over the multiplexed bus 40 is insufficient to allow the image data compressed at the second frequency 205 (FPS40) through, provision is made to continue broadcasting the image data for the last displayed image in order to ensure that the light source will keep at least one lighting function in operation, for the safety of the driver and of other road users.

Figure 5A:
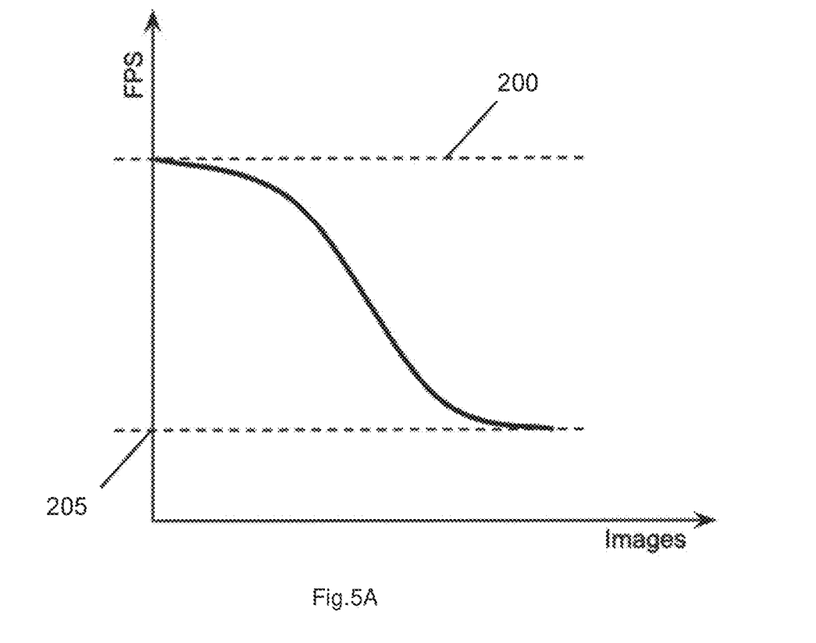
FIGS. 5A and 5B show the result on the compression rate obtained by virtue of the frequency change when the method according to the invention is used.
Figure 5B:
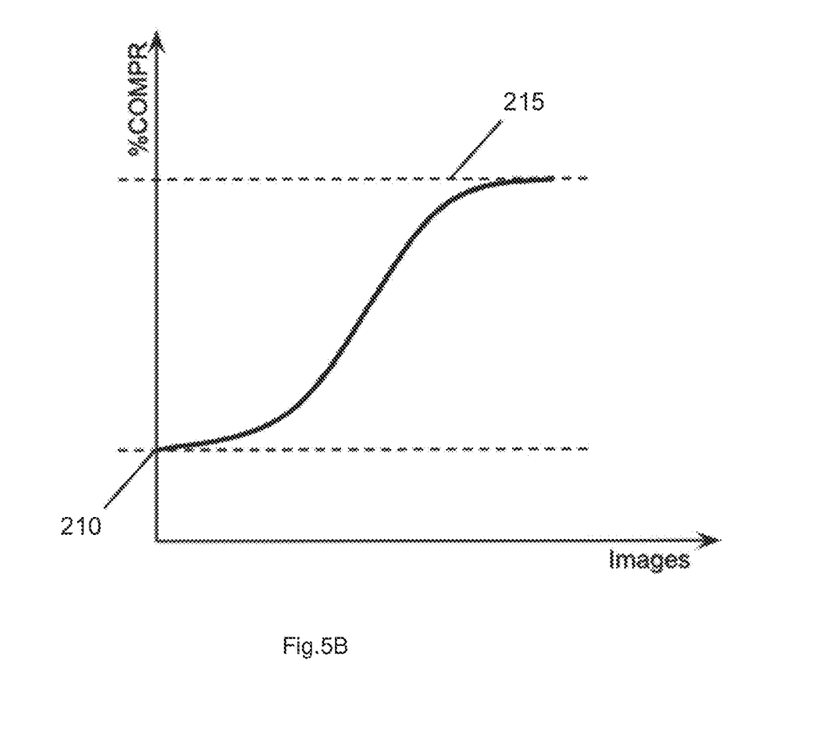

Reference is now made to FIG. 5A and FIG. 5B which show the result on the compression rate that is obtained by virtue of the frequency change when the method according to the invention is used. By limiting the display frequency, that is to say by changing the display frequency for the function to be displayed from a first frequency 200 (FPS50) to a second frequency 205 (FPS40), which is lower, the amount of image data to be compressed is reduced. As a result, the total required compression rate 210 (over the set of images per second) for the first display frequency 200 (FPS50) may be improved, and change to a compression rate value 215 that is higher than 210.

By virtue of the method, it is then possible to:
reduce the amount of image data to be communicated via the multiplexed bus,
maintain a high level of image data compression while observing the maximum allowed bandwidth,
maintain good image quality without having, for example, to degrade it by further compressing the already compressed image data in order to succeed in observing the maximum bit rate of the multiplexed bus,
provide for the transmission of high-definition image data over the multiplexed bus while only temporarily negatively affecting the display fluidity of the lighting function.

Figure 6:
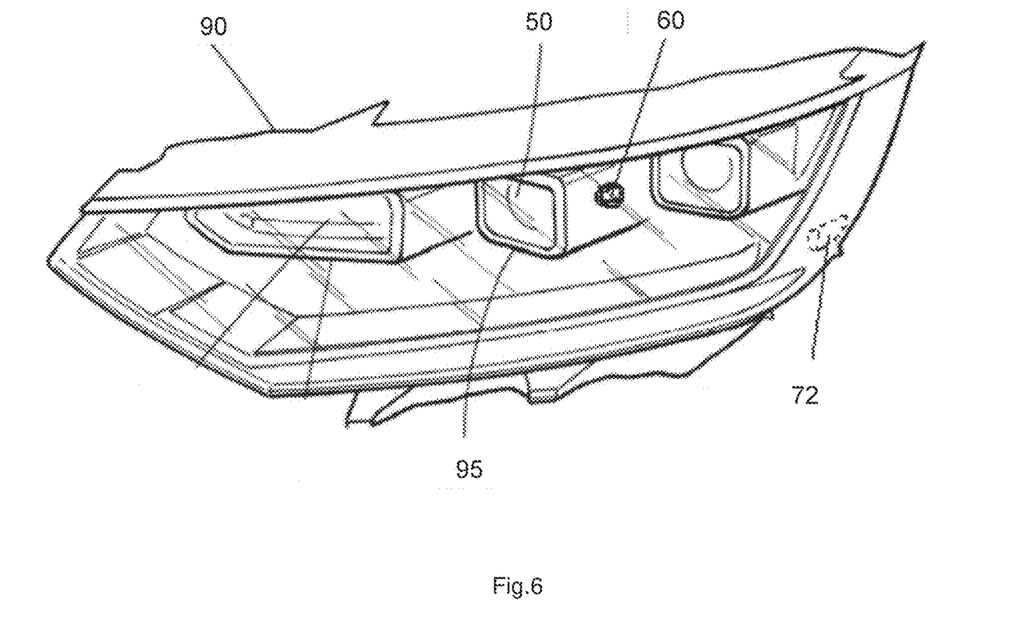
FIG. 6 shows a vehicle lighting device comprising at least a portion of the lighting system according to the invention.

Reference is now made to FIG. 6 which shows a vehicle front-headlamp lighting device 90, this lighting device 90 comprising:
the lighting module 50 comprising at least one light source 60;
an optic 95 associated with the light source 60 to generate light beams for desired lighting functions;
the control unit 72 to perform the steps of receiving and decompressing the compressed image data.

The invention has been described with reference to particular embodiments, which are not limiting. Of course, the present invention is not limited to the embodiment described by way of an example and it extends to other alternative embodiments.

For example, the invention could also apply to a lighting system comprising at least one vehicle taillight and/or one vehicle signaling light and/or one vehicle interior lighting module with a view to generating the lighting functions associated therewith while benefiting from the advantages proposed by and obtained using the invention by means of the technique of compressing image data according to a dynamic display frequency.

What is claimed is:

1. A method for managing image data in a vehicle lighting system, the lighting system:
including at least one lighting module capable of projecting lighting functions on the basis of compressed image data, and
multiplexed bus for transmitting compressed image data to the at least one lighting module,
the method comprising:
receiving an instruction to trigger at least one lighting function), the at least one lighting function being configured to be generated by the at least one lighting module from compressed image data corresponding to lighting patterns displayed in a given frequency range,
determining, for the generation of at least one lighting function at a first frequency chosen in the given frequency range, a bit rate level required to transmit the compressed image data over the multiplexed bus,
comparing the determined bit rate level with a bit rate threshold value of the multiplexed bus,
compressing the image data of the at least one lighting function at:
the first frequency when the determined bit rate level is lower than or equal to the bit rate threshold value, and at
a second frequency chosen in the given frequency range such that the second frequency is lower than the first frequency, when the determined bit rate level is greater than the bit rate threshold value,
transmitting the image data compressed at one of the first and second frequencies to the at least one lighting module via the multiplexed bus in order for the at least one lighting function to be generated.

2. The method as claimed in claim 1, wherein the given frequency range is between 10 Hz and 120 Hz.

3. The method as claimed in claim 1, wherein the first frequency is chosen between 50 Hz and 60 Hz and the second frequency is chosen between 30 Hz and 40 Hz.

4. The method as claimed in claim 1, wherein the compression of the image data of the at least one lighting function is performed at a compression rate greater than or equal to 75%.

5. The method as claimed in claim 1, wherein the at least one lighting function is at least one lighting function chosen from among high beam, adaptive driving beam and road writing.

6. The method as claimed in claim 1, wherein multiple lighting functions may be generated simultaneously by the lighting system.

7. The method as claimed in claim 1,
further comprising:
determining, for the generation of the at least one lighting function at the second frequency, a bit rate level required to transmit the compressed image data over the multiplexed bus, comparing the determined bit rate level with the bit rate threshold value of the multiplexed bus, transmitting, to the at least one lighting module via the multiplexed:
- image data compressed at the second frequency when the determined bit rate level is lower than or equal to the bit rate threshold value, and
- image data of the last image transmitted via the multiplexed bus when the determined bit rate level is greater than the bit rate threshold value.

8. A vehicle lighting system comprising:

at least one lighting module capable of projecting lighting functions on the basis of compressed image data, a multiplexed bus for transmitting compressed image data to the at least one lighting module, and a control system configured to:
- receive an instruction to trigger at least one lighting function, the at least one lighting function being configured to be generated by the at least one lighting module from compressed image data corresponding to lighting patterns displayed in a given frequency range,
- determine, for the generation of at least one lighting function at a first frequency chosen in the given frequency range, a bit rate level required to transmit the compressed image data over the multiplexed bus,
- compare the determined bit rate level with a bit rate threshold value of the multiplexed bus,
- compress the image data of the at least one lighting function at the first frequency when the determined bit rate level is lower than or equal to the bit rate threshold value and at a second frequency chosen in the given frequency range such that the second frequency is lower than the first frequency, when the determined bit rate level is greater than the bit rate threshold value, and
- transmit the image data compressed at one of the first and second frequencies to the at least one lighting module via the multiplexed bus in order for the at least one lighting function to be generated.

9. The vehicle lighting system as claimed in claim 8, wherein the control system includes:

a first control unit, provided with a processor unit, configured to:
- compress image data according to one of the first and second frequencies for generating the at least one lighting function,
- transmit, to the at least one lighting module via the multiplexed bus, the compressed image data, and a second control unit, provided with a processor unit, configured to:
- receive compressed image data that are transmitted via the multiplexed bus,
- compress the received image data,
- generate the at least one lighting function according to one of the first and second frequencies from the received and decompressed image data.

10. The vehicle lighting system as claimed in claim 8, wherein the at least one lighting module (MOD) includes a pixelated LED source.

* * * * *

UNITED STATES PATENT AND TRADEMARK OFFICE
CERTIFICATE OF CORRECTION

| | |
|---|---|
| PATENT NO. | : 12,041,705 B2 |
| APPLICATION NO. | : 17/918460 |
| DATED | : July 16, 2024 |
| INVENTOR(S) | : Yasser Almehio, Hafid El Idrissi and Constantin Prat |

It is certified that error appears in the above-identified patent and that said Letters Patent is hereby corrected as shown below:

In the Claims

In Claim 1, Column 10, Line 15, replace, ". . . the lighting system: . . ." with --. . . the lighting system . . .--

In Claim 1, Column 10, Line 19, replace, ". . . multiplexed bus for transmitting . . ." with --. . . a multiplexed bus for transmitting . . .--

In Claim 1, Column 10, Line 23, replace, ". . . function), the at least . . ." with --. . . function, the at least . . .--

In Claim 1, Column 10, Line 34, replace, ". . . function at: . . ." with --. . . function at . . .--

In Claim 7, Column 11, Lines 3 and 4, replace, ". . . via the multiplexed: . . ." with --. . . via the multiplexed bus: . . .--

In Claim 9, Column 12, Line 14, replace, ". . . compress image data . . ." with --. . . decompress image data . . .--

Signed and Sealed this
Seventeenth Day of September, 2024

Katherine Kelly Vidal
*Director of the United States Patent and Trademark Office*